UNITED STATES PATENT OFFICE.

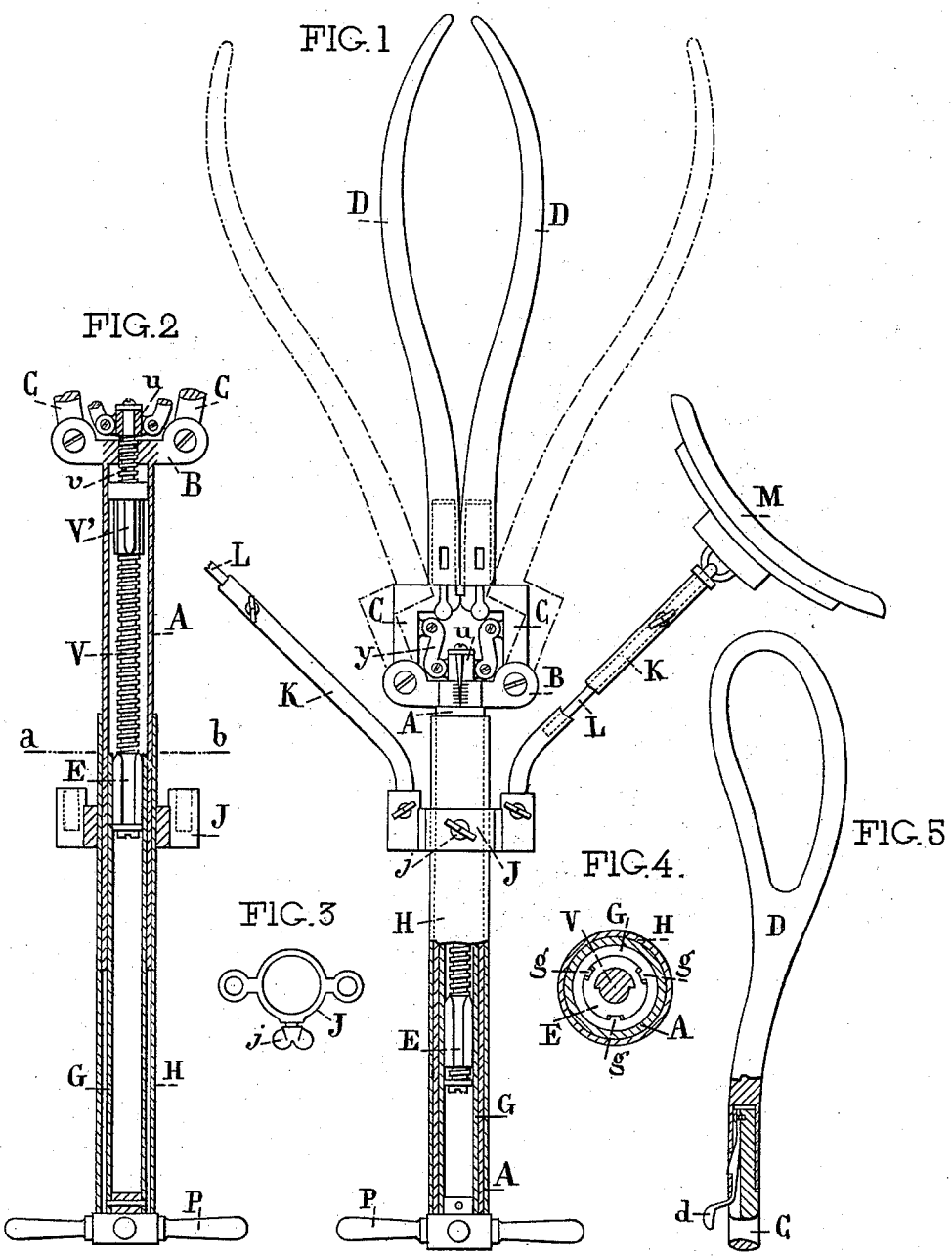

ABELARDO CARRILLO GALIANO, OF MADRID, SPAIN.

OBSTETRICAL FORCEPS.

SPECIFICATION forming part of Letters Patent No. 399,749, dated March 19, 1889.

Application filed October 10, 1888. Serial No. 287,779. (No model.) Patented in Spain March 12, 1888, No. 8,030, and in England September 21, 1888, No. 13,660.

*To all whom it may concern:*

Be it known that I, ABELARDO CARRILLO GALIANO, a subject of the King of Spain, residing at Madrid, in the Kingdom of Spain, have invented certain new and useful Improvements in Mechanical Forceps, (for which I have received patents in Spain March 12, 1888, No. 8,030, and in England September 21, 1888, No. 13,660,) of which the following is a specification.

The present invention refers to improvements in mechanical forceps, and its object is to permit the operation of the extraction of the child to be performed with greater facility and safety by substituting mechanical closing and traction for that effected by hand, as it was done up to the present.

In the accompanying drawings, Figure 1 represents an elevation, partly in section, of the forceps at the moment of seizing the child. Fig. 2 is a section of the handle of the forceps at the moment when the operator begins the extraction. Fig. 3 is a plan of the adjustable bracket carrying the support. Fig. 4 is a section on *a b* of Fig. 2 on a larger scale. Fig. 5 represents one of the arms or branches, partly in section, showing the mode of mounting it.

The forceps consist of the principal tube A, to which is fixed a cross-piece, B, to the ends of which are pivoted the supports C, on which are mounted the arms or branches D of the forceps. Between the said supports C is a little nut or sleeve, *u*, which is connected with the supports by means of pivoted links *y* in such a manner that when the nut or sleeve *u* is raised the supports C, with their arms or branches D, are extended. When the nut or sleeve is lowered again, the supports and the arms or branches are closed up. The ends of the arms or branches D fit into sockets formed in their supports C, and are held therein by means of springs *d*, which only need be pressed down to permit the arms or branches to be removed from the sockets.

In the interior of the principal tube A is a square threaded right-handed screw, V. This screw V is provided with a head, V', which is surmounted by another right-handed screw, *v*, of smaller diameter. These screws and the intermediate head are made in one piece. The upper end of the smaller screw passes through the cross-piece B of the principal tube, which is formed with an inner screw-thread, and the extremity is attached to the above-named nut or sleeve *u*. The intermediate head between the screws is cylindrical and is formed with three vertical grooves. A nut, E, of the same form as the intermediate head, V'—*i. e.*, formed with three grooves—turns on the lower or larger screw, V.

In the interior of the principal tube A fits a second tube, G, which telescopes with the principal tube, and the lower end of which is fixed to a handle, P. At the top this inner tube, G, is provided with three spurs or teeth, *g*, which can fit in the grooves of the intermediate head or of the nut on the larger screw. The principal tube A is further surrounded by an outer tube, H, which slides thereon, and is provided with an adjustable cross-piece or bracket, J, carrying two adjustable hollow arms, K, in which slide rods, on the ends of which padded supports M are mounted, which are adjusted to the inguinal regions of the mother during the operation.

The apparatus is used as follows: To open the arms or branches D of the forceps, the handle P and the inner tube are turned to the left, and the teeth or spurs *g* of this tube, which must in this instance engage the grooves of the intermediate head, will turn the head, and with it the nut or sleeve *u* operating the arms or branches. The degree of the extension of the arms or branches is shown by an indicator fixed to the nut or sleeve and moving on a scale formed on the cross-bar B of the principal tube A, so that when the arms or branches are introduced in the pelvic cavity the operator knows exactly the extent of the opening of the arms or branches. To close the arms or branches to seize the infant, it suffices to turn the handle to the right. The operator draws the handle, with the inner tube, G, out now until the spurs or teeth of the latter engage with the grooves of the above-named nut. The inguinal supports are then adjusted, and there remains nothing more for the extraction of the infant but to turn the handle from left to right. By this movement the nut on the lower screw is turned by the teeth or spurs of the inner tube, thus drawing out this screw with the principal tube and the branches or arms holding the infant. In this manner a receding or retreating of the infant (which takes place so often in consequence of a nervous spasm of the mother, or want of firmness on the part of the operator) is prevented. The facility with which the arms or branches of the forceps are mounted on their supports permits of the introduction of the two branches or arms first and then mounting them on their supports. This arrangement also permits the arms or branches to be replaced by other instruments employed in the parturition.

Having now particularly described and ascertained the nature of my said invention and in what manner the same is to be performed, I declare that what I claim is—

1. In mechanical forceps, the combination, with the arms or branches mounted on supports which can be extended and brought together, of a screw connected to said supports for moving the same and the head or nut on said screw and the movable tube or key engaging the same, substantially as described and illustrated.

2. In mechanical forceps, the combination, with the removable arms or branches mounted on supports which can be extended and brought together, of a screw and pivoted links operated thereby and connected to the movable supports for moving the same and the head or nut on said screw and the movable tube or key engaging the same, substantially as described.

3. In mechanical forceps, the combination, with the inner longitudinally-movable tube provided with the internal spurs or teeth and the intermediate head having teeth for engagement therewith, of the screw V and nut E, substantially as and for the purpose herein described.

4. In mechanical forceps, the combination, with the supporting-tube, of the adjustable brackets thereon, bearing the extensible arms and pads which bear against the inguinal regions of the mother and serve as supports during the extraction of the child, substantially as described.

5. In an extracting mechanism, the combination, with the tube G, provided with spurs or teeth, of the nut E, engaging said spurs or teeth, the handles P, secured to tube G, and screw V, engaging said nut and carrying the arms or branches, whereby when the handle is turned the screw and the arms or branches are withdrawn, substantially as described.

In testimony whereof I have hereunto set my hand in the presence of the two subscribing witnesses.

ABELARDO CARRILLO GALIANO.

Witnesses:
ACHILLE MARILLIER.
JEAN ROBELET.